United States Patent
Parker (10) Patent No.: US 7,400,482 B2
(45) Date of Patent: Jul. 15, 2008

(54) CIRCUIT BREAKER AND METHOD FOR SENSING CURRENT INDIRECTLY FROM BIMETAL VOLTAGE AND DETERMINING BIMETAL TEMPERATURE AND CORRECTED TEMPERATURE DEPENDENT BIMETAL RESISTANCE

(75) Inventor: Kevin L. Parker, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 244 days.

(21) Appl. No.: 11/333,002

(22) Filed: Jan. 17, 2006

(65) Prior Publication Data

US 2007/0165349 A1 Jul. 19, 2007

(51) Int. Cl.
*H02H 3/08* (2006.01)
(52) U.S. Cl. .............. 361/93.1; 361/93.7; 361/93.8; 361/103; 361/105; 361/106
(58) Field of Classification Search ............. 361/93.1, 361/93.7, 103, 105, 106, 115
See application file for complete search history.

(56) References Cited

U.S. PATENT DOCUMENTS

| 4,245,780 | A |   | 1/1981 | Franz |
|---|---|---|---|---|
| 4,327,397 | A | * | 4/1982 | McCleery ............... 361/90 |
| 4,420,033 | A |   | 12/1983 | Franz |
| 4,486,733 | A |   | 12/1984 | Moldovan et al. |
| 4,517,543 | A |   | 5/1985 | Brubaker |
| 4,536,736 | A |   | 8/1985 | Aschenbach |
| 4,538,199 | A | * | 8/1985 | Bielinski et al. ........... 361/93.8 |
| 4,573,132 | A |   | 2/1986 | Boothman et al. |
| 4,633,210 | A |   | 12/1986 | Mallonen et al. |
| 4,866,559 | A | * | 9/1989 | Cobb et al. ............... 361/103 |
| 5,198,956 | A | * | 3/1993 | Dvorak ................... 361/106 |
| 5,222,009 | A |   | 6/1993 | Scharnick et al. |
| 5,224,006 | A |   | 6/1993 | MacKenzie et al. |
| 5,318,268 | A |   | 6/1994 | Cox et al. |
| 5,475,371 | A | * | 12/1995 | Dunk et al. .............. 340/660 |
| 5,546,262 | A | * | 8/1996 | Baurand et al. ........... 361/31 |
| 5,691,869 | A |   | 11/1997 | Engel et al. |
| 6,297,607 | B1 |   | 10/2001 | Becker |
| 6,351,361 | B1 | * | 2/2002 | Kawazu et al. ............ 361/103 |
| 6,813,131 | B2 |   | 11/2004 | Schmalz |
| 6,876,532 | B2 | * | 4/2005 | Engel et al. .............. 361/93.8 |
| 2005/0052809 | A1 | * | 3/2005 | Evans et al. ............. 361/103 |
| 2007/0247767 | A1 | * | 10/2007 | Zhang .................... 361/42 |

* cited by examiner

*Primary Examiner*—Ramon M Barrera
(74) *Attorney, Agent, or Firm*—Martin J Moran (57) ABSTRACT

A circuit breaker includes a bimetal electrically connected in series with separable contacts, and an operating mechanism structured to open and close the contacts. A temperature sensor distal from the bimetal includes an output having an ambient temperature signal. A trip circuit includes a first circuit having a first input electrically interconnected with a bimetal output to input a voltage representative of current, a second input electrically interconnected with the temperature sensor output to input the ambient temperature signal, a real-time thermal model structured to provide a corrected temperature dependent bimetal resistance as a function of the voltage and the ambient temperature signal, and an output including a current value which is a function of the ambient temperature signal and the corrected bimetal resistance. A second circuit includes an input having the current value and an output structured to actuate the operating mechanism in response to predetermined current conditions.

14 Claims, 4 Drawing Sheets

FIG.4

CIRCUIT BREAKER AND METHOD FOR SENSING CURRENT INDIRECTLY FROM BIMETAL VOLTAGE AND DETERMINING BIMETAL TEMPERATURE AND CORRECTED TEMPERATURE DEPENDENT BIMETAL RESISTANCE

BACKGROUND OF THE INVENTION

1. Field of the Invention

This invention pertains generally to circuit interrupters and, more particularly, to circuit breakers including a bimetal in series with separable contacts. The invention also pertains to methods for determining bimetal temperature and/or bimetal resistance.

2. Background Information

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which heats and bends in response to a persistent overcurrent condition. The bimetal, in turn, unlatches a spring powered operating mechanism, which opens the separable contacts of the circuit breaker to interrupt current flow in the protected power system.

In certain circuit breaker applications (e.g., without limitation, arc fault detection), the voltage across the thermal bimetal element is employed as an indirect measurement of the circuit breaker load current. Sensing current with a bimetal element is complicated by the variation of that element's impedance as a function of temperature. This variation results in inaccuracies in the measurement of the amplitude of the measured current. For example, the bimetal element's impedance can vary as much as about 70% with temperature over the normal operating range of the circuit breaker depending upon the type of bimetallic material used.

As is typical with most metals, the bimetal impedance has a positive temperature coefficient (PTC). In other words, resistance increases with temperature. If the design of the circuit breaker electronics assumes that the bimetal resistance is constant, then any resistance-temperature variation of the bimetal can introduce error in the current sensing. This variation can cause proportional inaccuracies in the measurement of the load current, thereby affecting performance of control algorithms implemented in the circuit breaker electronics. As bimetal temperature rises, the voltage drop across the bimetal increases for a given amount of load current. The net effect is that the load current appears larger than it really is. Depending on the control algorithm, the potential result could be an errant command to trip the circuit breaker.

U.S. Pat. No. 4,486,733 discloses an electrothermal responsive protective mechanism of the bimetal type having also an ambient temperature compensating bimetal element to maintain accurate operation of the protective mechanism despite ambient temperature changes.

U.S. Pat. No. 6,813,131 discloses a circuit breaker trip assembly including a bimetal element and a thermistor. The thermistor is a temperature-sensing device, which is adapted to respond to the temperature of the bimetal element, in order to measure the approximate temperature thereof. For example, if located in close proximity to the bimetal element, the thermistor will be subjected to less extreme temperatures since the power dissipated by the bimetal element is dispersed to the cooler ambient environment within the circuit breaker housing. Even in close proximity, the temperature sensed by the thermistor proximate the bimetal element, although less extreme, is still proportional to the actual temperature of the bimetal element. An amplifier input is referenced to the bimetal element output terminal. The bimetal impedance has a positive temperature coefficient, while the thermistor has a negative temperature coefficient. Responsive to the thermistor, the amplifier provides a negative gain with respect to the bimetal voltage. In turn, the trip assembly provides a trip signal as a function of the compensated amplifier output voltage.

There is room for improvement in circuit breakers including a bimetal in series with separable contacts.

There is also room for improvement in methods for determining bimetal temperature and/or bimetal resistance.

SUMMARY OF THE INVENTION

These needs and others are met by the present invention, which compensates for variations of bimetal electrical resistance with temperature when sensing circuit breaker current indirectly by bimetal voltage. Significantly, a bimetal temperature sensor that is in physical contact with or proximate to the bimetal is not required.

In accordance with one aspect of the invention, a circuit breaker comprises: a housing; separable contacts; a bimetal electrically connected in series with the separable contacts, the bimetal including a temperature dependent resistance and an output having a voltage representative of current flowing through the separable contacts; an operating mechanism structured to open and close the separable contacts; a temperature sensor distal from the bimetal, the temperature sensor including an output having a signal representative of ambient temperature; and a trip circuit cooperating with the operating mechanism to trip open the separable contacts, the trip circuit comprising: a first circuit including a first input electrically interconnected with the output of the bimetal to input the voltage representative of current flowing through the separable contacts, a second input electrically interconnected with the output of the temperature sensor to input the signal representative of ambient temperature, a real-time thermal model structured to provide a corrected temperature dependent resistance of the bimetal as a function of the voltage representative of current flowing through the separable contacts and the signal representative of ambient temperature, and an output including a current value which is a function of the voltage representative of current flowing through the separable contacts and the corrected temperature dependent resistance, and a second circuit including an input having the current value and an output structured to actuate the operating mechanism in response to predetermined current conditions.

The first circuit may comprise a processor structured to repetitively execute an iterative algorithm as the real-time thermal model.

The processor may be further structured to periodically input the voltage representative of current flowing through the separable contacts and the signal representative of ambient temperature.

The processor may be further structured on an initial iteration of the iterative algorithm to determine (a) an initial absolute temperature of the bimetal from the ambient temperature plus a predetermined value, (b) an instantaneous power dissipated by the bimetal, and (c) a temperature rise of the bimetal over the ambient temperature, and on a subsequent iteration of the iterative algorithm to determine (d) a subsequent absolute temperature of the bimetal from a subsequent input of the ambient temperature plus the temperature rise of the bimetal over the ambient temperature, (e) a subsequent instantaneous power dissipated by the bimetal, and (f) a subsequent temperature rise of the bimetal over the subsequent inputted ambient temperature.

The processor may be further structured to calculate the corrected temperature dependent resistance of the bimetal as a predetermined function of the subsequent absolute temperature of the bimetal.

The processor may be further structured to calculate the subsequent instantaneous power dissipated by the bimetal from the square of the voltage of the bimetal divided by the corrected temperature dependent resistance of the bimetal.

The processor may be further structured on another iteration after the subsequent iteration to determine (g) another absolute temperature of the bimetal from another input of the ambient temperature plus the subsequent temperature rise of the bimetal, (h) another instantaneous power dissipated by the bimetal for the another iteration after the subsequent iteration, and (i) another temperature rise of the bimetal over the other inputted ambient temperature.

The processor may be further structured to save the subsequent instantaneous power dissipated by the bimetal and the subsequent temperature rise of the bimetal for use by another iteration after the subsequent iteration.

As another aspect of the invention, a method of determining a temperature of a bimetal electrically connected in series with separable contacts and including an output having a voltage representative of current flowing through the separable contacts, comprises: sensing a temperature representative of ambient temperature; inputting the voltage representative of current flowing through the separable contacts; and employing a real-time thermal model to determine the temperature of the bimetal from the sensed temperature representative of ambient temperature and the voltage representative of current flowing through the separable contacts.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the statement that a part is "electrically interconnected with" one or more other parts shall mean that the parts are directly electrically connected together or are electrically connected together through one or more electrical conductors or generally electrically conductive intermediate parts. Further, as employed herein, the statement that a part is "electrically connected to" one or more other parts shall mean that the parts are directly electrically connected together or are electrically connected together through one or more electrical conductors.

The present invention is described in association with an arc fault circuit breaker, although the invention is applicable to a wide range of circuit interrupters.

Figure 1:
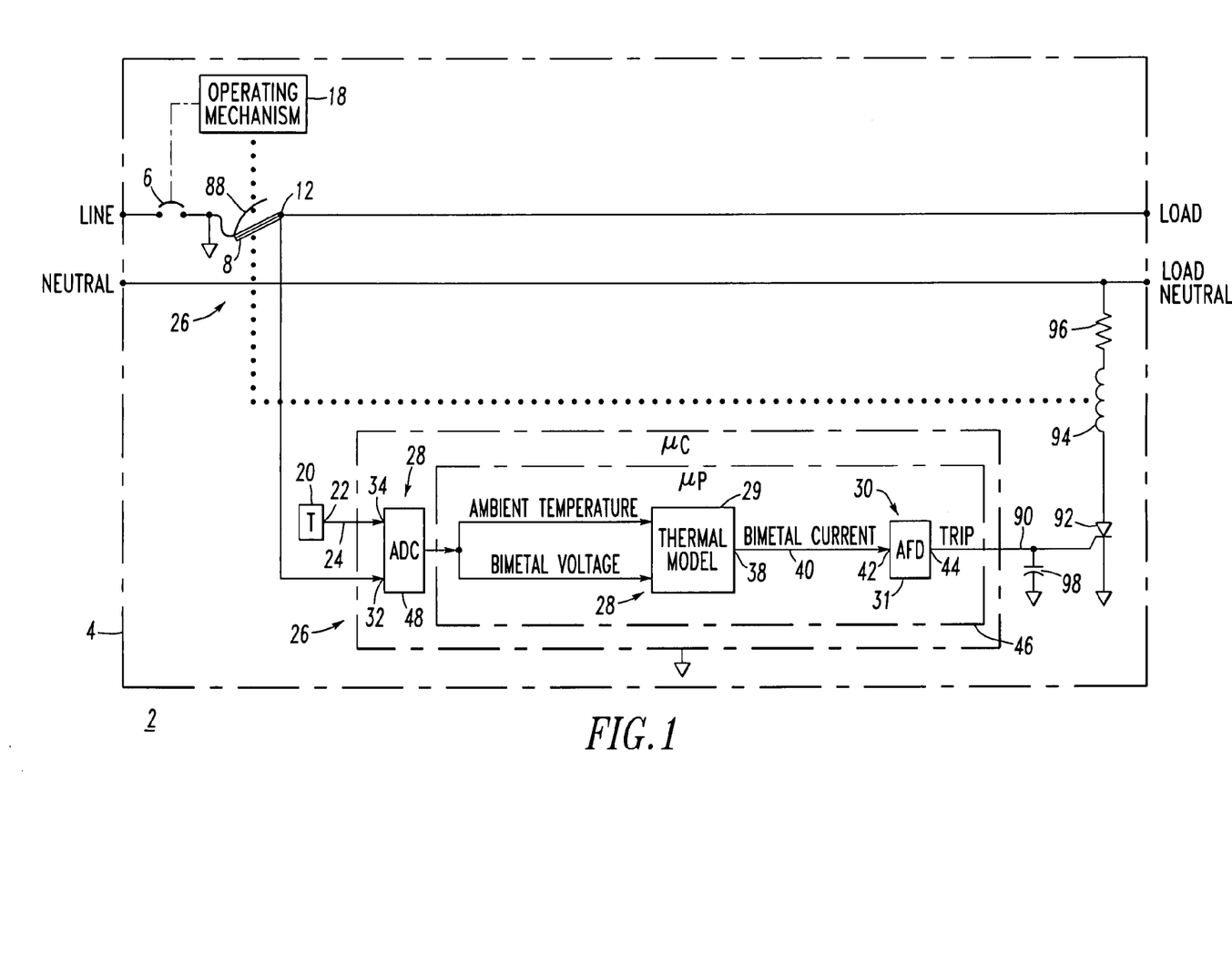
FIG. 1 is a block diagram of a circuit breaker in accordance with the present invention.

Referring to FIG. 1, a circuit breaker 2 includes a housing 4, separable contacts 6 and a bimetal 8 electrically connected in series with the separable contacts 6. The bimetal 8 includes a temperature dependent resistance 10 (FIG. 2) and an output 12 having a voltage 14 (FIG. 2) representative of current 16 (FIG. 2) flowing through the separable contacts 6. An operating mechanism 18 is structured to open and close the separable contacts 6. A temperature sensor (T) 20 is disposed distal from the bimetal 8 and includes an output 22 having a signal 24 representative of ambient temperature.

A trip circuit 26 cooperates with the operating mechanism 18 to trip open the separable contacts 6. The trip circuit 26 includes a first circuit 28 providing a real-time thermal model function 29 and a second circuit 30 providing a trip function 31 (e.g., without limitation, arc fault detection (AFD)). The first circuit 28 includes a first input 32 electrically interconnected with the output 12 of the bimetal 8 to input the voltage 14 (FIG. 2) representative of the current 16 (FIG. 2) flowing through the separable contacts 6, and a second input 34 electrically interconnected with the output 22 of the temperature sensor 20 to input the signal 24 representative of ambient temperature. As will be discussed below in connection with FIGS. 2-4, the real-time thermal model function 29 is structured to provide a corrected temperature dependent resistance 36 (FIGS. 3 and 4) of the bimetal 8 as a function of the bimetal voltage 14 (FIG. 2) and the signal 24 representative of ambient temperature. In turn, the thermal model function 29 provides an output 38 including a bimetal current value 40 which is a function of the bimetal voltage 14 and the corrected temperature dependent bimetal resistance 36. The AFD trip function 31 includes an input 42 having the current value 40 and an output 44 structured to actuate the operating mechanism 18 in response to predetermined current conditions.

Examples of suitable arc fault detectors are disclosed, for instance, in U.S. Pat. No. 5,224,006, with a preferred type described in U.S. Pat. No. 5,691,869, which is hereby incorporated by reference herein.

EXAMPLE 1

The first circuit 28 includes a suitable processor (μP) 46 structured to repetitively execute an iterative algorithm (58 of FIG. 3 or 58' of FIG. 4) as the real-time thermal model function 29. The μP 46 includes or cooperates with an analog-to-digital converter (ADC) 48 and is structured to periodically input the voltage 14 representative of current flowing through the separable contacts 6 and the signal 24 (e.g., without limitation, voltage) representative of ambient temperature. As will be discussed below in connection with FIGS. 2-4, the μP 46 measures bimetal voltage 14 and circuit breaker ambient temperature, employs the thermal model function 29 to estimate bimetal temperature 50 (FIGS. 3 and 4) and bimetal electrical resistance 36 (FIGS. 3 and 4), and derives the circuit breaker current 86 (FIGS. 3 and 4) from these quantities. In particular, the μP 46 senses the voltage 24 representing ambient temperature and the bimetal voltage 14 using the ADC 48, and processes that information using the algorithm 58 of FIG. 3 or 58' of FIG. 4 to provide the circuit breaker current 86.

EXAMPLE 2

Figure 2:
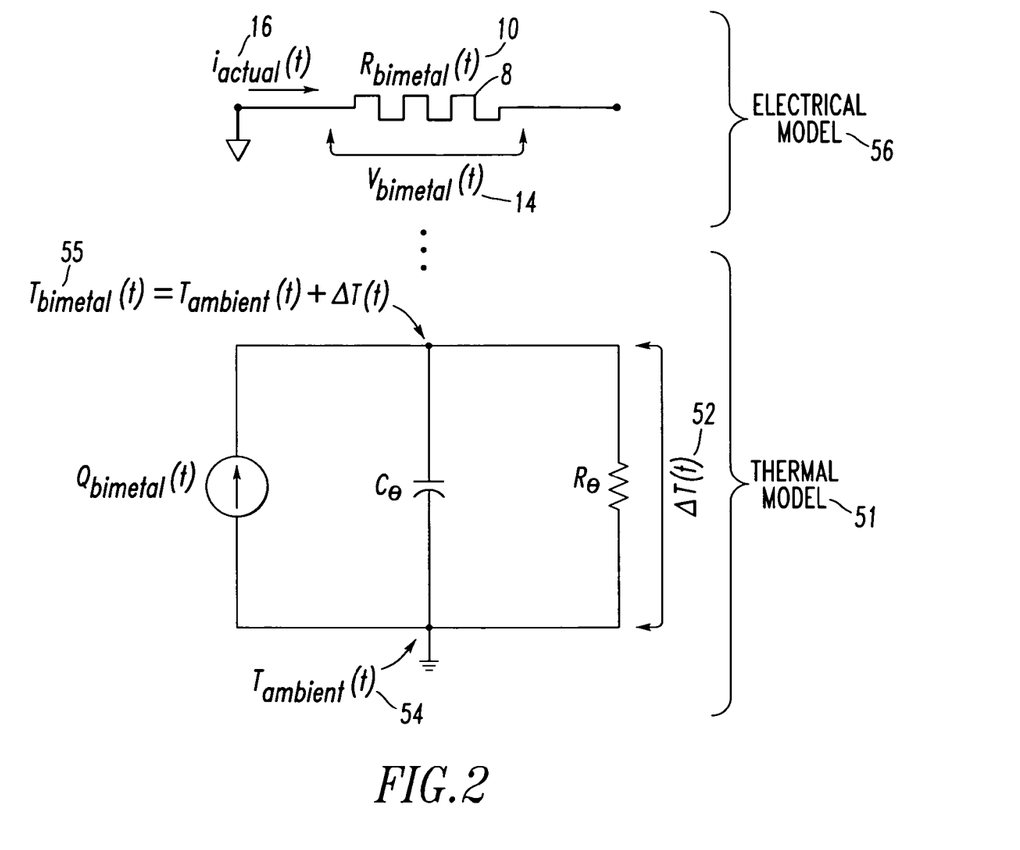
FIG. 2 is a block diagram in schematic form showing the electrical model and the thermal model employed by the processor of FIG. 1.

The ambient temperature is within the circuit breaker housing 4. The μP 46 employs the temperature sensor 20 (e.g., without limitation, a thermistor, disposed distal (i.e., a suitable distance in order to measure ambient temperature) from the bimetal 8) to sense the circuit breaker internal ambient temperature. Then, the µP 46 employs the bimetal voltage 14 (FIG. 2) and a thermal model 51 (FIG. 2) of the bimetal 8 and the circuit breaker 2 to estimate the transient bimetal temperature rise 52 (FIG. 2) above the circuit breaker internal ambient temperature 54 (FIG. 2). The estimated transient bimetal temperature rise 52 and the internal ambient temperature 54 are employed to estimate the absolute bimetal temperature 55 (FIG. 2) and to determine the bimetal resistance 10, which is then employed to estimate the actual circuit breaker current 16.

EXAMPLE 3

The µP 46 preferably discrete-time samples the bimetal voltage 14 (FIG. 2) at a suitable sampling frequency that is equal to or greater than the Nyquist rate (i.e., rapid enough that the entire spectral content of the voltage waveform is captured). See, for example, the sampling period, $T_s$, of Equation 4, below.

EXAMPLE 4

Although a processor-based current sensing mechanism is disclosed, discrete digital electronic components and/or a continuous-time system (e.g., without limitation, employing analog electronics) and/or combinations thereof may be employed. Alternatively, other suitable current sensing mechanisms may be employed. One example includes analog/digital hybrid bimetal voltage sensing, in which the half-cycle integral or peak of the bimetal voltage is first determined with an analog circuit and then is digitally sampled.

EXAMPLE 5

FIG. 2 shows a linked first-order continuous-time electrical model 56 and the thermal model 51 of the bimetal 8 and the associated circuit breaker 2 (FIG. 1). This model may be replaced by a more detailed model (Example 6, below) if increased accuracy is desired. The thermal resistance of the bimetal 8, $R_\Theta$ (° C./W), to the circuit breaker internal ambient temperature (° C.) 54 models transient and steady state heat loss from the bimetal 8 including conduction, convection and radiation. The thermal capacitance of the bimetal, $C_\Theta$ (J/° C.), models transient and steady state temperature rise in the bimetal 8 due to power dissipation. The estimated instantaneous power dissipated by the bimetal 8 is given by $Q_{bimetal}(t)$ (W). $\Delta T(t)$ is the estimated temperature rise 52 of the bimetal 8 over the circuit breaker internal ambient temperature 54 versus time, t. $\Delta T(t)$ is determined by solving the continuous-time expression of Equation 1.

$$\Delta T(t) = \frac{1}{C_\Theta} \int Q_{C_\Theta}(t) \cdot dt \qquad \text{(Eq. 1)}$$

wherein:

$Q_{C_\Theta}(t)$ is the net instantaneous power transfer into the circuit breaker bimetal 8.

Using Kirchhoff's law for heat flow, Equation 1 is rewritten to provide the expression of Equation 2.

$$\Delta T(t) = \frac{1}{C_\Theta} \int \left( Q_{bimetal}(t) - \frac{\Delta T(t)}{R_\Theta} \right) \cdot dt \qquad \text{(Eq. 2)}$$

Equation 3 provides a corresponding Laplace domain expression from Equation 2.

$$\Delta T(s) = \frac{\frac{1}{C_\Theta}}{s + \frac{1}{R_\Theta \cdot C_\Theta}} \cdot Q_{bimetal}(s) \qquad \text{(Eq. 3)}$$

wherein:

s is defined from $\mathcal{L}^{-1}\{\Delta T(s)\} = \Delta T(t)$;

$\mathcal{L}^{-1}$ is the Inverse Laplace Transform Operator; and $\Delta T(t=0^-)=0$.

Equation 4 provides a substitution for Equation 3 to derive a discrete-time version of the above continuous-time model through backward rectangular integration.

$$s = \frac{1}{T_s} \cdot (1 - z^{-1}) \qquad \text{(Eq. 4)}$$

wherein:

$T_s$ is sampling period (seconds) (e.g., without limitation, about 1 ms for a 60 Hz line cycle; a suitable period such that the sampling frequency is equal to or greater than the Nyquist rate);

z is the discrete-time system equivalent of the Laplace operator s found in continuous-time systems, and is defined from $Z^{-1}\{\Delta T(z)\} = \Delta T(n)$;

$Z^{-1}$ is the Inverse Z Transform Operator; and $\Delta T(n=0)=0$.

Equation 5 represents the discrete-time equivalent of the thermal model 51.

$$\Delta T(n) = \left[ \frac{\frac{1}{C_\Theta}}{\frac{1}{T_s} + \frac{1}{R_\Theta \cdot C_\Theta}} \right] \cdot Q_{bimetal}(n) + \left[ \frac{\frac{1}{T_s}}{\frac{1}{T_s} + \frac{1}{R_\Theta \cdot C_\Theta}} \right] \cdot \Delta T(n-1) \qquad \text{(Eq. 5)}$$

wherein:

n is an integer, which is greater than or equal to zero;

$\Delta T(n)$ is the estimated temperature rise of the bimetal 8 over the circuit breaker internal ambient temperature (° C.) for sample n;

$Q_{bimetal}(n)$ is the estimated instantaneous power (W) dissipated by the bimetal 8 for sample n; and $\Delta T(n-1)$ is the estimated temperature rise (° C.) of the bimetal 8 over the circuit breaker internal ambient temperature for sample n−1.

EXAMPLE 6

Relatively better performance in the discrete-time model 51 is achieved by employing a better integration method, such as trapezoidal integration. Equation 6 provides a suitable substitution for Equation 3.

$$s = \frac{2}{T_s} \cdot \frac{1 - z^{-1}}{1 + z^{-1}} \quad \text{(Eq. 6)}$$

Equation 7 represents a relatively more accurate discrete-time equivalent of the thermal model 51.

$$\Delta T(n) = \left[\frac{\frac{1}{C_\Theta}}{\frac{2}{T_s} + \frac{1}{R_\Theta \cdot C_\Theta}}\right] \cdot [Q_{bimetal}(n) + Q_{bimetal}(n-1)] + \left[\frac{\frac{2}{T_s} - \frac{1}{R_\Theta \cdot C_\Theta}}{\frac{2}{T_s} + \frac{1}{R_\Theta \cdot C_\Theta}}\right] \cdot \Delta T(n-1) \quad \text{(Eq. 7)}$$

wherein:

$Q_{bimetal}(n-1)$ is the estimated instantaneous power (W) dissipated by the bimetal 8 for sample n−1.

EXAMPLE 7

Figure 3:
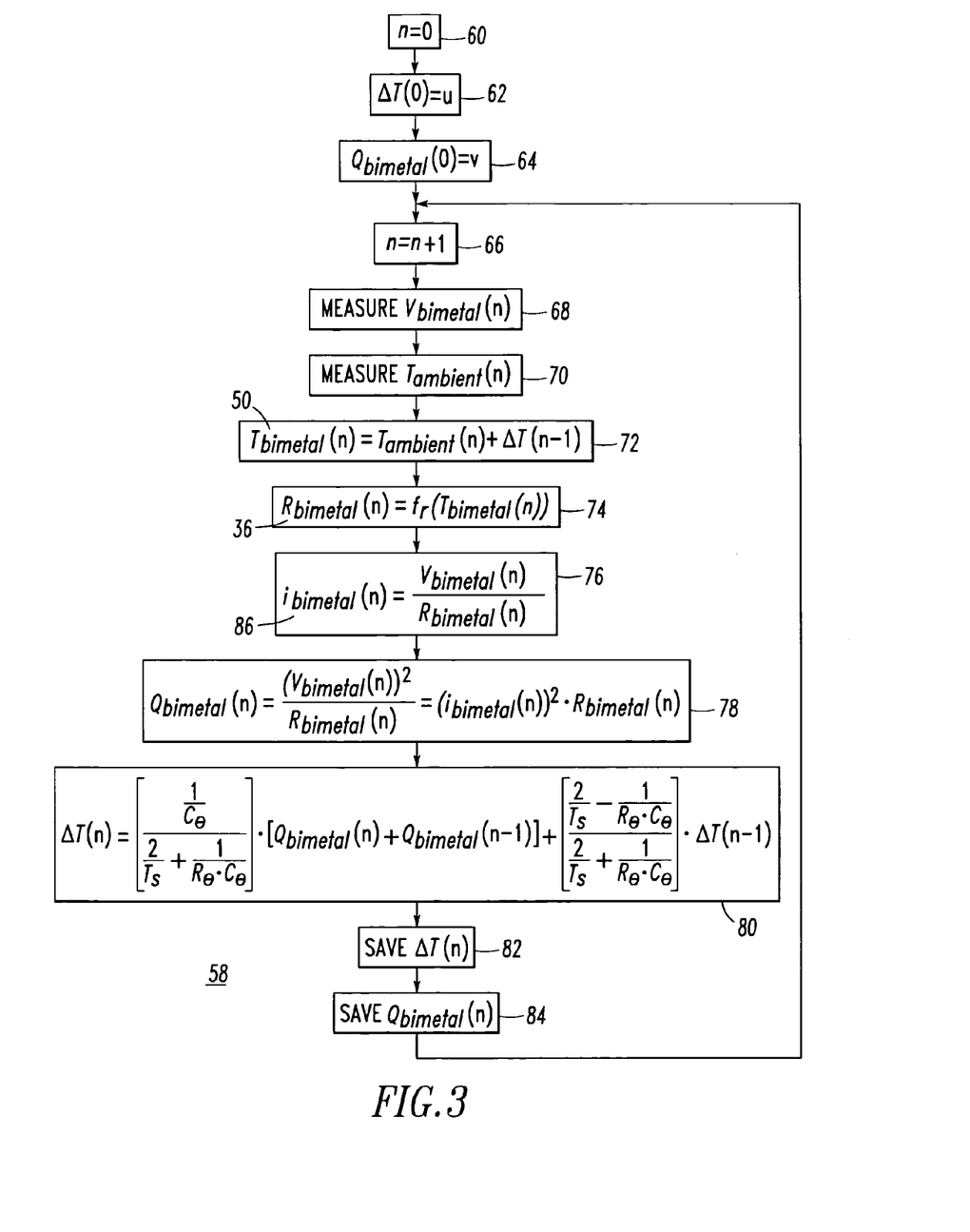
FIG. 3 is a flowchart of an algorithm for the electrical and thermal models of FIG. 2.

FIG. 3 shows the algorithm 58 employing the thermal model of Example 6. First, at 60, integer n, which represents a sample number, is set to zero. Next, at 62, a suitable initial bimetal temperature rise above ambient, $\Delta T(0)$, is set to value u for sample 0, which value is a predetermined value (° C.) (e.g., without limitation, zero; about zero; any suitable value). Then, at 64, a suitable initial estimated instantaneous power dissipated by the bimetal, $Q_{bimetal}(0)$, is set to value v for sample 0, which value is a predetermined value (W) (e.g., without limitation, zero; about zero; any suitable value). Then, at 66, the integer, n, is incremented. Next, at 68 and 70, the voltage of the bimetal 8, $V_{bimetal}(n)$ (V), and the circuit breaker internal ambient temperature, $T_{ambient}(n)$ (° C.), are respectively measured through the ADC 48 (FIG. 1). Next, at 72, the estimated absolute temperature 50 of the bimetal (° C.) for sample n is determined from Equation 8.

$$T_{bimetal}(n) = T_{ambient}(n) + \Delta T(n-1) \quad \text{(Eq. 8)}$$

wherein:

$T_{ambient}(n)$ is the absolute temperature of the circuit breaker internal ambient (° C.), for example, as measured by the thermistor 20 (FIG. 1); and $\Delta T(n-1)$ is the previously estimated temperature rise of the bimetal 8 over the circuit breaker internal ambient temperature (° C.) for sample n−1.

Then, at 74, the estimated electrical resistance 36 of the bimetal 8, $R_{bimetal}(n)$ (Ω), is determined for sample n from Equation 9.

$$R_{bimetal}(n) = f_r(T_{bimetal}(n)) \quad \text{(Eq. 9)}$$

wherein:

$f_r(T)$ is a function (e.g., without limitation, derived from data obtained from the bimetal manufacturer; nearly a linear function; approximated by a linear function; a hash function) that represents or approximates the variation of bimetal resistance (Ω) with bimetal temperature (° C.). This provides the corrected temperature dependent bimetal resistance as a predetermined function of the absolute temperature of the bimetal 8.

Next, at 76, the estimated instantaneous electric current 86 flowing through the bimetal, $i_{bimetal}(n)$ (A), is determined for sample n from Equation 10.

$$i_{bimetal}(n) = \frac{V_{bimetal}(n)}{R_{bimetal}(n)} \quad \text{(Eq. 10)}$$

Then, at 78, the estimated instantaneous power dissipated by the bimetal, $Q_{bimetal}(n)$ (W), is determined from one of Equations 11 and 12.

$$Q_{bimetal}(n) = \frac{(V_{bimetal}(n))^2}{R_{bimetal}(n)} \quad \text{(Eq. 11)}$$

$$Q_{bimetal}(n) = (i_{bimetal}(n))^2 \cdot R_{bimetal}(n) \quad \text{(Eq. 12)}$$

Next, at 80, $\Delta T(n)$ is determined based on the thermal model from Equation 7, above.

Finally, at 82 and 84 $\Delta T(n)$ and $Q_{bimetal}(n)$ are respectively saved for use in the next iteration (sample n+1), which is repeated beginning at step 66.

Hence, the μP 46 determines the following on an initial iteration of the iterative algorithm 58: (a) an initial absolute temperature of the bimetal 8 from the ambient temperature plus a predetermined value, u, at step 62, (b) an instantaneous power dissipated by the bimetal 8 at step 78, and (c) a temperature rise of the bimetal 8 over the ambient temperature at step 80. Then, on the subsequent iteration of the iterative algorithm 58, the μP 46 determines: (d) a subsequent absolute temperature of the bimetal 8 from a subsequent input of the ambient temperature plus the temperature rise of the bimetal over the ambient temperature at step 72, (e) a subsequent instantaneous power dissipated by the bimetal at step 78, and (f) a subsequent temperature rise of the bimetal over the subsequent inputted ambient temperature at step 80. This process continues on a subsequent iteration of the iterative algorithm 58 to refine the absolute temperature of the bimetal 8 from another input of the ambient temperature plus the subsequent temperature rise of the bimetal 8, another instantaneous power dissipated by the bimetal 8, and another temperature rise of the bimetal 8 over the last input of the ambient temperature.

EXAMPLE 8

Figure 4:
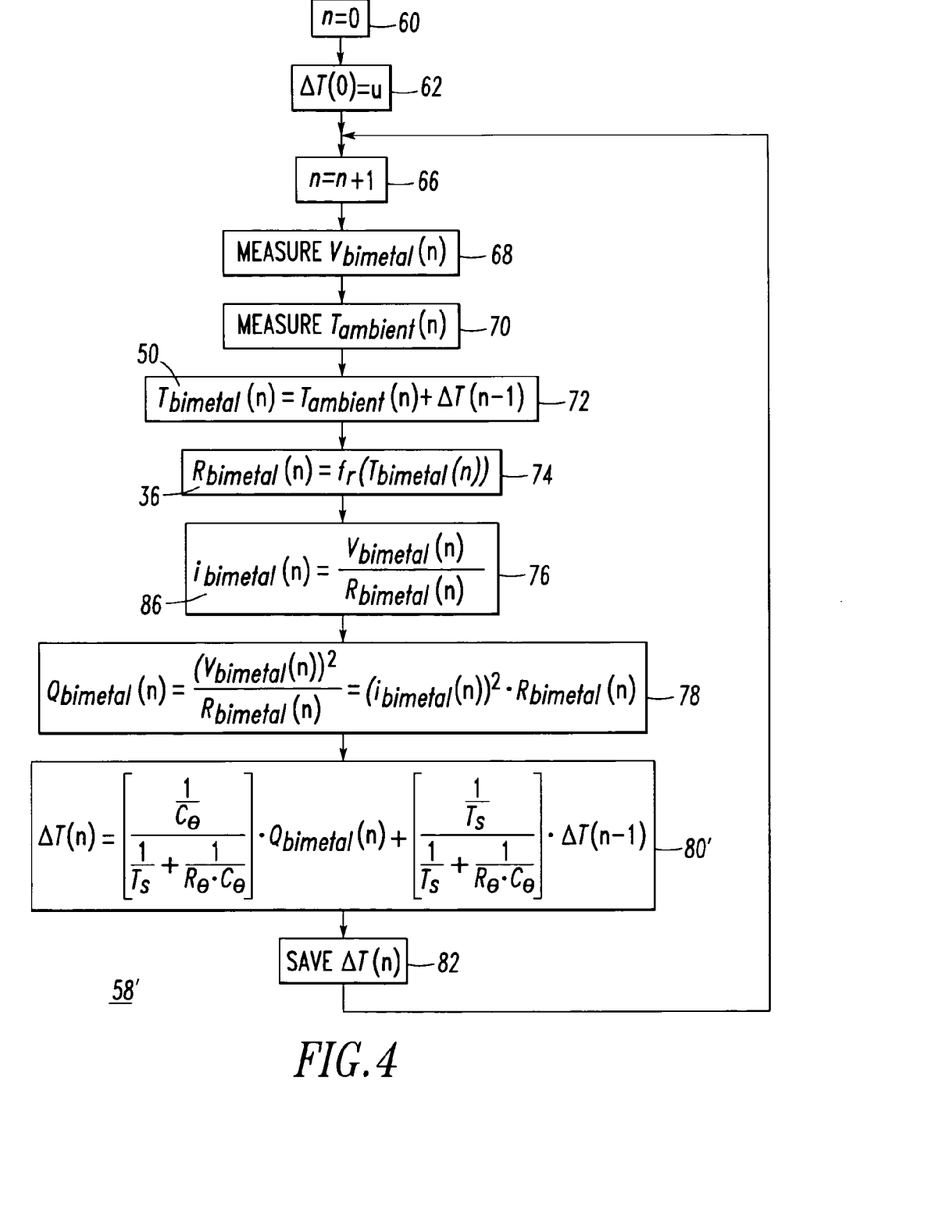
FIG. 4 is a flowchart of an electrical and thermal model algorithm in accordance with another embodiment of the invention.

FIG. 4 shows the algorithm 58' employing the thermal model of Example 5. This algorithm 58' is similar to the algorithm 58 of FIG. 3 except that step 64, $Q_{bimetal}(0) = v$, and step 84, save $Q_{bimetal}(n)$ for use in the next iteration, are not employed, and except that Equation 5 is used in place of Equation 7 at step 80'.

EXAMPLE 9

A transient error in the estimated current 86 may arise if $\Delta T(0)$ (the assumed initial temperature rise of the bimetal 8 over ambient temperature at step 62 of FIGS. 3 and 4) is different than the actual initial temperature rise of the bimetal 8 over ambient temperature. This error may be no worse than that of a conventional circuit breaker trip unit (which has no compensation for bimetal resistance variation with temperature). Furthermore, given time, the error will decay to zero. One way to address this error is to initially set ΔT(0) equal to zero, in order that the estimated bimetal resistance 36, $R_{bimetal}$(n) is minimized and, thus, $i_{bimetal}$(n) 86 must be equal to or greater than the actual bimetal current 16 (FIG. 2). This approach offers a way to err on the safe side, but could potentially cause circuit breaker nuisance trips in some instances.

EXAMPLE 10

If the thermal models of Examples 5 and 6 are not parameterized precisely, they may still yield useful information as long as the estimated bimetal electrical resistance 36 approximates, but does not exceed, the actual bimetal electrical resistance 10 (FIG. 2). In this case, the temperature-related error in the current measurement will be nonzero, but will be less than that of a circuit breaker with no temperature compensation.

EXAMPLE 11

If the estimated bimetal electrical resistance 36 (as calculated by the algorithms 58,58') becomes greater than the actual bimetal electrical resistance 10 (FIG. 2), then the estimated circuit breaker current 86 is less than the actual circuit breaker current 16 (FIG. 2). Hence, the circuit breaker 2 and bimetal thermal model parameters ($R_\Theta$ and $C_\Theta$) must be suitably chosen to ensure that this case does not occur.

EXAMPLE 12

The example trip circuit 26 includes an armature 88, which is attracted by the large magnetic force generated by very high overcurrents to also actuate the operating mechanism 18 and provide an instantaneous trip function.

A trip signal 90 is generated at the AFD output 44 in order to turn on a suitable switch, such as the silicon controlled rectifier (SCR) 92, to energize a trip solenoid 94. The trip solenoid 94, when energized, actuates the operating mechanism 18 to trip open the separable contacts 6. A resistor 96 in series with the coil of the solenoid 94 (or the resistance of the coil if the resistor 96 is not used) limits the coil current and a capacitor 98 protects the gate of the SCR 92 from voltage spikes and false tripping due to noise.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A circuit breaker comprising:
    a housing;
    separable contacts;
    a bimetal electrically connected in series with said separable contacts, said bimetal including a temperature dependent resistance and an output having a voltage representative of current flowing through said separable contacts;
    an operating mechanism structured to open and close said separable contacts;
    a temperature sensor distal from said bimetal, said temperature sensor including an output having a signal representative of ambient temperature; and
    a trip circuit cooperating with said operating mechanism to trip open said separable contacts, said trip circuit comprising:
        a first circuit including a first input electrically interconnected with the output of said bimetal to input said voltage representative of current flowing through said separable contacts, a second input electrically interconnected with the output of said temperature sensor to input said signal representative of ambient temperature, a real-time thermal model structured to provide a corrected temperature dependent resistance of said bimetal as a function of said voltage representative of current flowing through said separable contacts and said signal representative of ambient temperature, and an output including a current value which is a function of said voltage representative of current flowing through said separable contacts, and said corrected temperature dependent resistance, and
        a second circuit including an input having said current value and an output structured to actuate said operating mechanism in response to predetermined current conditions.

2. The circuit breaker of claim 1 wherein said first circuit comprises a processor structured to repetitively execute an iterative algorithm as said real-time thermal model.

3. The circuit breaker of claim 2 wherein said processor is further structured to periodically input said voltage representative of current flowing through said separable contacts and said signal representative of ambient temperature.

4. The circuit breaker of claim 2 wherein said processor is further structured on an initial iteration of said iterative algorithm to determine (a) an initial absolute temperature of said bimetal from said ambient temperature plus a predetermined value, (b) an instantaneous power dissipated by said bimetal, and (c) a temperature rise of said bimetal over said ambient temperature, and on a subsequent iteration of said iterative algorithm to determine (d) a subsequent absolute temperature of said bimetal from a subsequent input of said ambient temperature plus said temperature rise of said bimetal over said ambient temperature, (e) a subsequent instantaneous power dissipated by said bimetal, and (f) a subsequent temperature rise of said bimetal over said subsequent inputted ambient temperature.

5. The circuit breaker of claim 4 wherein said predetermined value is a constant.

6. The circuit breaker of claim 5 wherein said constant is zero.

7. The circuit breaker of claim 4 wherein said processor is further structured to calculate said corrected temperature dependent resistance of said bimetal as a predetermined function of said subsequent absolute temperature of said bimetal.

8. The circuit breaker of claim 7 wherein said processor is further structured to calculate said current value from said voltage of said bimetal divided by said corrected temperature dependent resistance of said bimetal.

9. The circuit breaker of claim 7 wherein said processor is further structured to calculate said subsequent instantaneous power dissipated by said bimetal from the square of said voltage of said bimetal divided by said corrected temperature dependent resistance of said bimetal.

10. The circuit breaker of claim 7 wherein said processor is further structured to calculate ΔT(n) as said temperature rise of said bimetal over said ambient temperature from:

$$\Delta T(n) = \left[\frac{\frac{1}{C_\Theta}}{\frac{2}{T_s} + \frac{1}{R_\Theta \cdot C_\Theta}}\right] \cdot \left[\begin{array}{c}Q_{bimetal}(n) + \\ Q_{bimetal}(n-1)\end{array}\right] + \left[\frac{\frac{2}{T_s} - \frac{1}{R_\Theta \cdot C_\Theta}}{\frac{2}{T_s} + \frac{1}{R_\Theta \cdot C_\Theta}}\right] \cdot \Delta T(n-1); \text{ and}$$

wherein $R_\Theta$ is thermal resistance of said bimetal, $C_\Theta$ is thermal capacitance of said bimetal, $T_s$ is a sampling period between said initial iteration and said subsequent iteration, $Q_{bimetal}(n)$ is said instantaneous power dissipated by said bimetal for said subsequent iteration, $Q_{bimetal}(n-1)$) is said instantaneous power dissipated by said bimetal for said initial iteration, and $\Delta T(n-1)$ is said temperature rise of said bimetal over said ambient temperature for said initial iteration.

11. The circuit breaker of claim 4 wherein said processor is further structured on another iteration after said subsequent iteration to determine (g) another absolute temperature of said bimetal from another input of said ambient temperature plus said subsequent temperature rise of said bimetal, (h) another instantaneous power dissipated by said bimetal for said another iteration after said subsequent iteration, and (i) another temperature rise of said bimetal over said another inputted ambient temperature.

12. The circuit breaker of claim 4 wherein said processor is further structured to save said subsequent instantaneous power dissipated by said bimetal and said subsequent temperature rise of said bimetal for use by another iteration after said subsequent iteration.

13. The circuit breaker of claim 7 wherein said processor is further structured to calculate $\Delta T(n)$ as said temperature rise of said bimetal over said ambient temperature from:

$$\Delta T(n) = \left[\frac{\frac{1}{C_\Theta}}{\frac{1}{T_s} + \frac{1}{R_\Theta \cdot C_\Theta}}\right] \cdot Q_{bimetal}(n) + \left[\frac{\frac{1}{T_s}}{\frac{1}{T_s} + \frac{1}{R_\Theta \cdot C_\Theta}}\right] \cdot \Delta T(n-1);$$

wherein $R_\Theta$ is thermal resistance of said bimetal, $C_\Theta$ is thermal capacitance of said bimetal, $T_s$ is a sampling period between said initial iteration and said subsequent iteration, $Q_{bimetal}(n)$ is said instantaneous power dissipated by said bimetal for said subsequent iteration, and $\Delta T(n-1)$ is said temperature rise of said bimetal over said ambient temperature for said initial iteration.

14. The circuit breaker of claim 1 wherein said ambient temperature is within said housing.

\* \* \* \* \*